(12) United States Patent
Hered

(10) Patent No.: US 10,502,023 B2
(45) Date of Patent: Dec. 10, 2019

(54) VALVE ARRANGEMENT, SYSTEM AND METHOD

(71) Applicant: William A. Hered, Houston, TX (US)

(72) Inventor: William A. Hered, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 36 days.

(21) Appl. No.: 15/782,572

(22) Filed: Oct. 12, 2017

(65) Prior Publication Data

US 2019/0112894 A1    Apr. 18, 2019

(51) Int. Cl.
| | |
|---|---|
| *E21B 34/06* | (2006.01) |
| *F16K 47/04* | (2006.01) |
| *E21B 47/04* | (2012.01) |
| *E21B 34/08* | (2006.01) |
| *E21B 34/12* | (2006.01) |
| E21B 34/00 | (2006.01) |

(52) U.S. Cl.
CPC .............. *E21B 34/06* (2013.01); *E21B 34/08* (2013.01); *E21B 34/12* (2013.01); *E21B 47/04* (2013.01); *F16K 47/04* (2013.01); *E21B 2034/007* (2013.01)

(58) Field of Classification Search
CPC ..... E21B 34/06; E21B 2034/007; F16K 47/04
See application file for complete search history.

(56) References Cited

U.S. PATENT DOCUMENTS

| 8,863,848 B2 | 10/2014 | Elrick et al. |
| 2004/0129423 A1* | 7/2004 | Eddison ................ E21B 21/103 |
| | | 166/321 |
| 2011/0100643 A1 | 5/2011 | Themig et al. |
| 2011/0168410 A1* | 7/2011 | deBoer ................... E21B 21/10 |
| | | 166/386 |
| 2012/0097386 A1 | 4/2012 | Ward et al. |
| 2013/0168099 A1 | 7/2013 | Themig |
| 2019/0024480 A1* | 1/2019 | Thomson .............. E21B 21/103 |

FOREIGN PATENT DOCUMENTS

WO    2016074078 A1    5/2016

OTHER PUBLICATIONS

Notification of Transmittal of the International Search Report and the Written Opinion of the International Searching Authority, or the Declaration; PCT/US2018/049500; dated Dec. 21, 2018; 14 pages.

* cited by examiner

*Primary Examiner* — David J Bagnell
*Assistant Examiner* — Yanick A Akaragwe
(74) *Attorney, Agent, or Firm* — Cantor Colburn LLP

(57) ABSTRACT

A valve arrangement including a housing having a port, a closure member defining a bore, the bore being of a smaller flow area than an adjoining flow area to produce a lower pressure in flowing fluid therein than pressure in fluid flowing in the adjoining flow area, the closure member being disposed within the housing and movable between a closed position and an open position, a volume defined between the closure member and the housing, an opening in the closure member extending from the volume to the bore of the closure member to convey fluid pressure generated in the bore of the closure member to the volume thereby creating a lower pressure in the volume thereby biasing the closure member into a closed position.

13 Claims, 1 Drawing Sheet

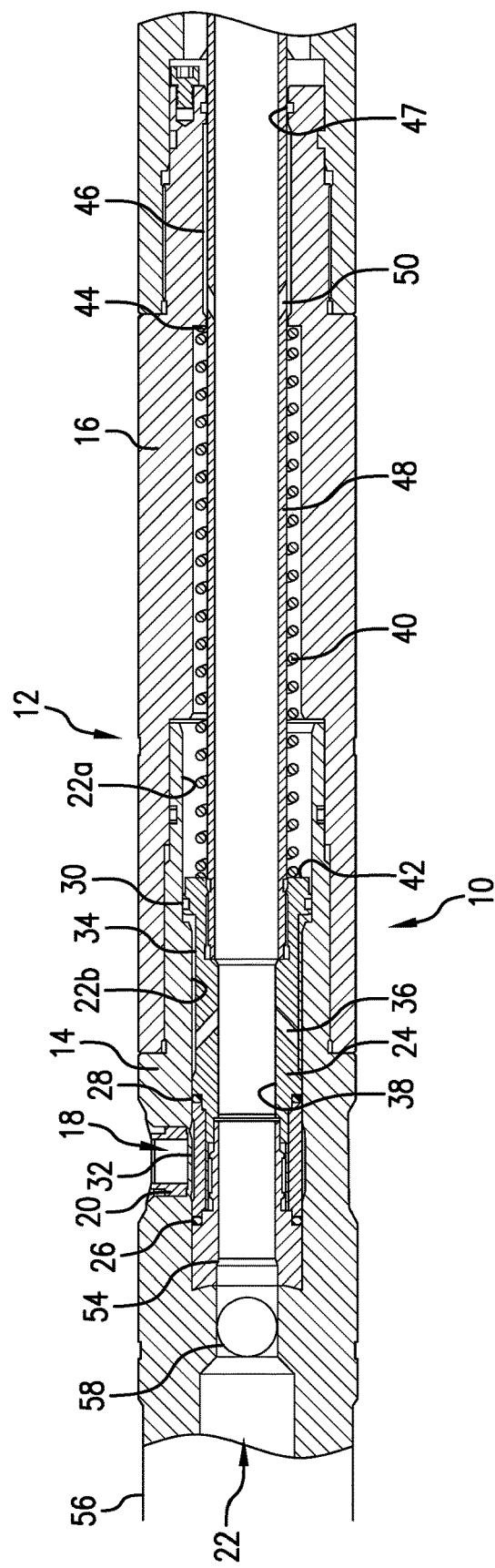

VALVE ARRANGEMENT, SYSTEM AND METHOD

BACKGROUND

In the resource recovery industry flow control arrangements are ubiquitous. Different arrangements and constructions are used for a variety of purposes. One arrangement is a flow diversion configuration known commercially as XP MCV from Baker Hughes a GE company LLC under product family number H14086. The arrangement includes a sleeve that occludes radial ports unless the sleeve is urged downstream subsequent to a plug landing on a seat therein. A spring is used to hold the sleeve closed against the flow of fluid therethrough when a plug is not on seat. The arrangement works well and is used often but the spring is costly and takes up valuable space. The art is always receptive to cost saving configurations achieving practical results.

SUMMARY

A valve arrangement including a housing having a port, a closure member defining a bore, the bore being of a smaller flow area than an adjoining flow area to produce a lower pressure in flowing fluid therein than pressure in fluid flowing in the adjoining flow area, the closure member being disposed within the housing and movable between a closed position and an open position, a volume defined between the closure member and the housing, an opening in the closure member extending from the volume to the bore of the closure member to convey fluid pressure generated in the bore of the closure member to the volume thereby creating a lower pressure in the volume thereby biasing the closure member into a closed position.

BRIEF DESCRIPTION OF THE DRAWINGS

The following descriptions should not be considered limiting in any way. With reference to the accompanying drawings, like elements are numbered alike:

The FIGURE is a schematic cross sectional view of a valve arrangement as disclosed herein.

DETAILED DESCRIPTION

A detailed description of one or more embodiments of the disclosed apparatus and method are presented herein by way of exemplification and not limitation with reference to the FIGURE.

Referring to the FIGURE, a valve arrangement 10 is illustrated. The arrangement 10 includes a housing 12 that may comprise a valve sub 14 and a spring sub 16 for assembly purposes or may be configured alternatively. As illustrated, the valve sub 14 includes a number of ports 18 that may or may not include nozzles or additional flow control devices 20 therein. The valve sub 14 further defines a through passage 22 therethrough that may include a stepped diameter. Since the through passage 22 is illustrated with a stepped diameter, alphanumeric designators 22a and 22b are used for clarity. Within the through passage 22b, and from which the port 18 extends, is closure member 24 illustrated as a sleeve. The closure member 24 includes three seals 26, 28 and 30 to produce two distinct volumes 32 and 34 between the closure member 24 and the valve sub 14. Volume 32 is at the port 18 so that with the sleeve in the position illustrated, seals 26 and 28 bridge the port 18 thereby preventing fluid egress from the through passage 22 through the port 18 to a space radially outwardly of the arrangement 10. Volume 34 is between seals 28 and 30. This volume also has an opening 36 connected therewith that can be configured to angle in the downstream direction as shown or can have any other orientation such as radial (orthogonally directed), or angling upstream in some iterations. The purpose of the opening is to convey pressure from flow bore 38 to the volume 34.

Attached to the valve sub 14 is spring sub 16 that houses a spring 40 bearing upon a spring face 42 of the closure member 24 and against a spring shoulder 44 of the spring sub 16. The spring 40 is a compressing spring that functions to urge the closure member 24 into the closed position (as shown). Spring sub 16 also includes a volume 46 extending between seal 30 and a seal 47 that includes the area of the spring sub 16 where the spring 40 is located such that pressure in the volume 46 is acts on the closure member 24. A tubular member 48 is illustrated connected to the closure member 24 and extending through the spring 40 and through the volume 46. Tubular 48 is optional but tends to protect the spring 40 from scale and debris. The tubular 48 includes a pressure conveyance 50 configured to convey pressure from fluid flowing in the tubular 48 to the volume 46. The pressure conveyance 50 is angled in the upstream direction to enhance an increased pressure in volume 46 and hence an increased pressure against closure member 24 in the area of the spring face 42 and against seal 30. The pressure assists spring 40 in urging the closure member 24 to the closed position. Further assisting the biasing of the closure member to the closed position is a lower pressure in volume 34 that is achieved by the flow of fluid through the flow bore 38. The bore 38 is specifically reduced in size to cause fluid moving therethrough to flow faster therein than it does adjacent thereto. It will be recognized that a structure that includes a restricted diameter flow passage will display flow characteristics of a higher velocity, lower temperature and (importantly to this disclosure) lower pressure according to the conservation of energy in the fluid. The lower pressure part of the condition is harnessed to assist the biasing of the closure member to the closed position. Additionally, the angling of the openings 36 in the downstream direction will further enhance the lower pressure due to a local venture effect of the fluid flowing across the opening 36. The effect on the volume 34 by fluid flow to reduce the pressure therein, causes a pressure differential across seal 30 that will tend to bias the closure member 24 to the closed position. This is beneficial to the art in that a smaller lighter and less costly spring may be employed while still having sufficient bias to substantially prevent fluid drag forces from causing inappropriate opening of the closure member 24. Similar to the prior art, the closure member is intended to be opened only after the landing of a plug on seat 54, which plug may be a ball, dart, etc.

In a system (the system being any tubular system including a wellbore system) wherein the valve arrangement 10 is part of a tubing string 56, the valve 10 is used to control flow to either a flow through direction or a diverted direction. If the closure member 24 is in the closed position and no plug 58 is on seat 54, then all flow will move through the arrangement 10 with the benefit noted of the closure member 24 being biased to the closed position by the differential pressure created by the particular configuration of the valve arrangement 10 disclosed herein. Once a plug 58 has been landed on seat 54, pressure behind the plug 58 will push the closure member 24 to the open position and allow flow out the port 18.

Set forth below are some embodiments of the foregoing disclosure:

Embodiment 1

A valve arrangement including a housing having a port, a closure member defining a bore, the bore being of a smaller flow area than an adjoining flow area to produce a lower pressure in flowing fluid therein than pressure in fluid flowing in the adjoining flow area, the closure member being disposed within the housing and movable between a closed position and an open position, a volume defined between the closure member and the housing, an opening in the closure member extending from the volume to the bore of the closure member to convey fluid pressure generated in the bore of the closure member to the volume thereby creating a lower pressure in the volume thereby biasing the closure member into a closed position.

Embodiment 2

The valve arrangement as in any previous embodiment wherein the housing comprises a valve housing and a spring housing.

Embodiment 3

The valve arrangement as in any previous embodiment wherein the closure member is a sleeve.

Embodiment 4

The valve arrangement as in any previous embodiment wherein the closure member includes seals in contact with housing defining a part of the volume.

Embodiment 5

The valve arrangement as in any previous embodiment wherein the opening is angled in a flow direction through the bore.

Embodiment 6

The valve arrangement as in any previous embodiment further including a spring acting on the closure member to bias the closure member to the closed position.

Embodiment 7

The valve arrangement as in any previous embodiment wherein the arrangement is configured to produce a higher pressure in the fluid flow downstream of the closure member.

Embodiment 8

The valve arrangement as in any previous embodiment wherein the higher pressure acts on the closure member across a seal between the closure member and the housing producing a pressure differential across the seal that biases the closure member to the closed position.

Embodiment 9

The valve arrangement as in any previous embodiment wherein the arrangement includes a tubular extending from the closure member, the tubular defining a pressure conveyance that conveys pressure to the closure member outside of the volume thereby biasing the closure member to the closed position.

Embodiment 10

A borehole system including a tubular string disposed in an earth formation the tubular string including a valve arrangement as in any previous embodiment.

Embodiment 11

A method for biasing a closure member of the valve arrangement as in any previous embodiment to a closed position including flowing a fluid through the bore thereby producing a reduced fluid pressure in the bore, allowing the lower fluid pressure from the bore to translocate to the volume through the opening thereby creating a lower pressure in the volume, flowing the fluid into an area outside of the bore that is larger thereby increasing fluid pressure in the fluid, causing the higher pressure fluid to act upon the closure member outside of the volume, biasing the closure member to the closed position with a differential pressure across portions of the closure member.

Embodiment 12

The method as in any previous embodiment wherein the causing the higher pressure fluid to act is by flowing the higher pressure fluid to a fluid conveyance in a tubular extending from the closure member.

Embodiment 13

A method for controlling fluid flow in a system including flowing a fluid through a valve arrangement as in any previous embodiment, biasing the closure member to a closed position by the flowing fluid, landing a plug on a seat of the closure member, pressuring up against the plug to move the closure member to the open position, and flowing fluid through the port.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A valve arrangement comprising:
   a housing having a port;
   a closure member defining a bore, the bore being of a smaller flow area than an adjoining flow area that produces a lower pressure in flowing fluid therein than pressure in fluid flowing in the adjoining flow area, the closure member being disposed within the housing and movable between a closed position and an open position;
   a first volume defined between the closure member and the housing;
   a second volume within the housing;
   a seal between the first volume and the second volume;
   an opening in the closure member extending from the first volume to the bore of the closure member to convey fluid pressure generated in the bore of the closure member to the first volume thereby creating a lower pressure in the first volume than in the second volume using the same flowing fluid thereby biasing the closure member into a closed position.

2. The valve arrangement as claimed in claim 1 wherein the housing comprises a valve housing and a spring housing.

3. The valve arrangement as claimed in claim 1 wherein the closure member is a sleeve.

4. The valve arrangement as claimed in claim 1 wherein the closure member includes seals in contact with housing defining a part of the first volume.

5. The valve arrangement as claimed in claim 1 wherein the opening is angled in a flow direction through the bore.

6. The valve arrangement as claimed in claim 1 further including a spring acting on the closure member to bias the closure member to the closed position.

7. The valve arrangement as claimed in claim 1 wherein the arrangement is configured to produce a higher pressure in the fluid flow downstream of the closure member.

8. The valve arrangement as claimed in claim 7 wherein the higher pressure acts on the closure member across a seal between the closure member and the housing producing a pressure differential across the seal that biases the closure member to the closed position.

9. The valve arrangement as claimed in claim 7 wherein the arrangement includes a tubular extending from the closure member, the tubular defining a pressure conveyance that conveys higher pressure to the closure member outside of the lower pressure first volume thereby biasing the closure member to the closed position.

10. A borehole system including a tubular string disposed in an earth formation the tubular string including the valve arrangement as claimed in claim 1.

11. A method for biasing the closure member of the valve arrangement of claim 1 to a closed position comprising: flowing a fluid through the bore thereby producing a reduced fluid pressure in the bore; allowing the lower fluid pressure from the bore to translocate to the first volume through the opening thereby creating a lower pressure in the first volume; flowing the fluid into an area outside of the bore that is larger thereby increasing fluid pressure in the fluid; causing the higher pressure fluid to act upon the closure member outside of the volume; biasing the closure member to the closed position with a differential pressure across the seal between the first volume and the second volume.

12. The method as claimed in claim 11 wherein the causing the higher pressure fluid to act is by flowing the higher pressure fluid to a fluid conveyance in a tubular extending from the closure member.

13. A method for controlling fluid flow in a system comprising: flowing a fluid through the valve arrangement as claimed in claim 1; biasing the closure member to a closed position by the flowing fluid; landing a plug on a seat of the closure member; pressuring up against the plug to move the closure member to the open position; and flowing fluid through the port.

* * * * *